March 30, 1965  E. WICHMANN ET AL  3,175,387
HIGH SPEED SWAGING MACHINE
Filed Nov. 14, 1962  3 Sheets-Sheet 3
Fig. 5
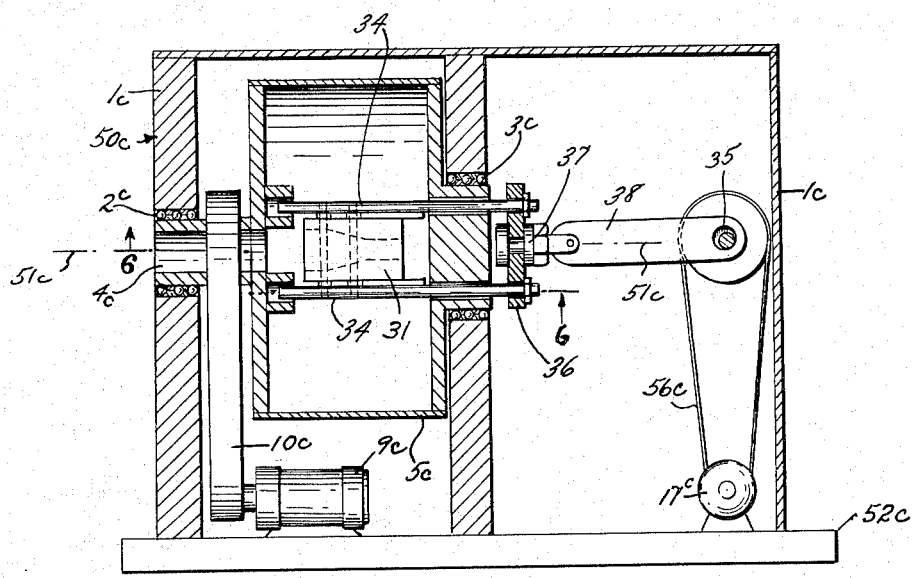
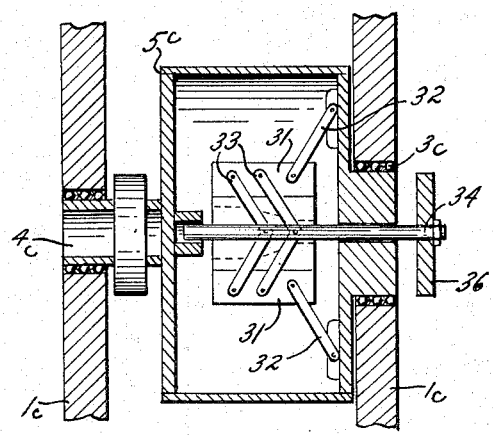
Fig. 6

United States Patent Office 3,175,387
Patented Mar. 30, 1965

3,175,387
HIGH SPEED SWAGING MACHINE
Ernst Wichmann and Richard Schminke, both % Cobelux
S.A., 14 Ave. du Theatre, Lausanne, Switzerland
Filed Nov. 14, 1962, Ser. No. 237,507
3 Claims. (Cl. 72—402)

This invention relates generally to machines for reducing metal stock, and more particularly to a high speed round kneading machine with one or more pairs of oscillatory dies.

In these machines, it is necessary, for continuing and symmetric fabrication of tubes or other material of the work piece, that the latter turn as well as feed in an axial direction in relation to the dies. In order to obtain these functions, special units are generally provided. The difficulty thereof is that the piece is clamped by the dies during the forming process, so that special arrangement has to be made in order to accomplish the axial feed and rotation of the work piece in the time intervals between the strokes. Such units are generally complicated and expensive.

Also, it is known in this kind of machine that one of the transport operations, either the rotation or the axial feeding, is done by the dies.

For instance, there are known swaging or round kneading machines with rotating pairs of dies, in which the rotation of the work piece is not necessary because the dies themselves are turning in relation to the work piece. But these machines cannot feed the work piece on their own, so that a special feeding unit still has to be provided, which feeds the work piece axially, between the strokes.

Furthermore, there are known forging machines, where the dies are placed in such a manner that they have a simultaneous axial moving component which feeds the work piece with every stroke in axial direction, but it is necessary to have a special unit to rotate the work piece during the time intervals between the strokes.

So, therefore, all of the known machines have to have special equipment for either one of the two work piece movements, either for the turning or the feeding step by step in the time intervals between the strokes. Such special equipments are not only complicated and expensive, but they do not act in accordance with the natural working process because the turning or the feeding of the piece, or both, are interrupted by each stroke, while the special unit tries to turn or to feed continuously. Furthermore, these movements have to be adapted to every change of the strokes. All of these difficulties are the reason that high speed swaging or round kneading machines are only used in a limited way.

It is therefore among the objects of the present invention to provide a high speed swaging machine which, on its own, performs all operations necessary to work the material, so that the forming, turning and feeding is obtained by movements of the dies, special feed or turning units being thereby eliminated.

Another object herein is the provision of a die housing which is coaxially disposed, turnable to the die center line, the die pairs being placed in said housing in such manner and arrangement as to make a simultaneous movement with each stroke, and either a special control or the machine itself creates the turning of the die housing with variable speed.

A further object herein lies in the provision of a swaging machine in which the dies turn around the piece while at the same time executing the forming and the axial feed; and in addition to this, the revolutions of the dies can be varied so that the proceeding can be adapted to the special conditions or requirements of the work piece.

A feature of the invention lies in the fact that the technical concept of the present machine is very simple because only a supplementary turnable mounted die housing with variable speed control is required. Because of the counter effect of the pairs of dies, the forming efforts will be completely absorbed in the housing and kept away from the body of the machine and its anchoring.

As a consequence of the elimination of special transport units, the present machine is not only simple, low-cost, and foolproof, but also very compact. The complete continuation operation thereof opens great possibilities of adaption and a great number of new applications.

These objects, and other incidental ends and advantages, will more fully appear in the progress of this disclosure and be pointed out in the appended claims.

In the drawings, similar reference characters designate corresponding parts throughout the views of each embodiment.

FIGURE 5 is an axial sectional view of a third embodiment of the invention.

FIGURE 6 is a fragmentary sectional view as seen from the plane 6—6 on FIGURE 5.

Figure 1:
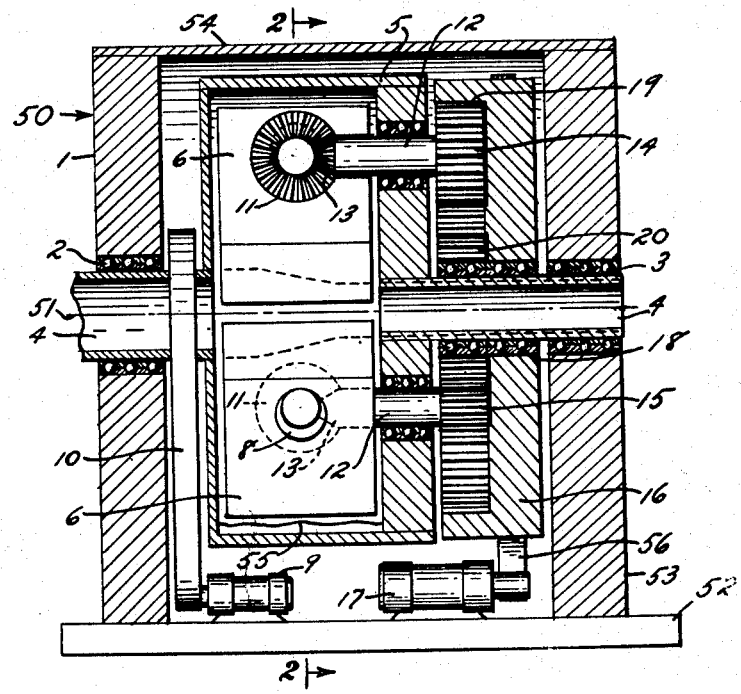
FIGURE 1 is an axial sectional view of a first embodiment of the invention.
Figure 2:
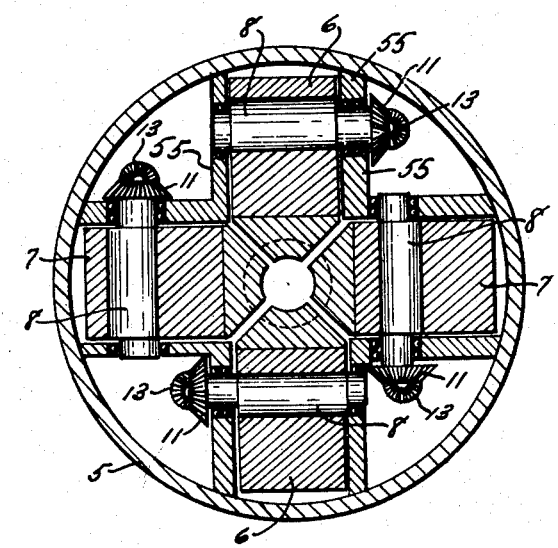
FIGURE 2 is a fragmentary sectional view as seen from the plane 2—2 on FIGURE 1.

Turning to the first embodiment of the invention, the machine, generally indicated by reference character 50, has a machine housing 1 having bearings 2 and 3 in which is journalled a hollow shaft 4. On the hollow shaft 4 is a die housing 5. Housing 1 may include base 52, body 53 and top 54.

In the die housing 5 are disposed counter-running pairs of dies 6—6 and 7—7 which rotate concentrically about the axis 51 along which a work piece (not shown, but which may be of any suitable shape and material) travels as worked.

Each of the dies 6—6 and 7—7 is mounted on its own eccentric or crankshaft 8 which lies in a plane perpendicular to the axis 51. When rotated, the crankshafts 8 give the dies 6—6 and 7—7 a counter-running oscillating movement. Thus when an opposite pair of dies approach each other toward the axis 51, they strike, press and form the work piece; they also move in a direction to advance and feed the work piece, simultaneously having both components.

The crankshafts 8 are journalled in portions 55 which are secured to the inside of the die housing 5. At one end of each of the crankshafts 8 there is a bevel gear 11 which is in mesh with a corresponding bevel gear 13 on one end of the main shafts 12. Shafts 12 are rotatably mounted in a wall of the die housing 5 parallel to axis 51, and at their other ends are provided with pinions 14 and 15 (FIGURE 1) which lie outside of the die housing 5.

Rotatably mounted by bearing 18 on the shaft 4 is a flywheel 16 which may move independently of said shaft. This flywheel 16 rotates independently of shaft 4 and may be driven by a motor 17, through variable transmission means 56. The flywheel 16 has, at its rim, an internal gear 19 and near its center a smaller external gear 20. The crankshafts 8 and the main shafts 12 are disposed at different distances from the axis 51, so that pinions 14 on shafts 12 engage outer gear 19, and pinions 15 engage the gear 20. The gear ratios are such that all of the shafts 12 turn at the same speed, and by virtue of the described system of gears, opposed crankshafts 8 rotate in opposite directions. This causes the pairs of dies 6—6 and 7—7, in addition to their counter-running, perpendicular to the center line of the hollow shaft 4, forming the work piece, at the same time to perform a movement in the direction of the work piece feeding movement, and to thereby transport the work piece as long as the dies touch the work piece. Consequently, the work pieces get a feed impulse with each stroke.

The die housing 5 and the shaft 4 are rotated as a unit, independently of the flywheel 16, by a motor 9 and variable transmission means 10. The direction of rotation is reversible and the rate of rotation is variable between minimum and maximum in both directions of rotation. Thus it is possible to run the pairs of dies 6—6 and 7—7 around the work piece at any desirable speed during operation.

The speed of revolution of the flywheel 16 can be changed absolutely independently of the speed of revolution of the die housing 5. By this it is possible to regulate the forming strike and the axial feed independently from the rotation speed of the dies 6—6 and 7—7. These three movements (forming strike, axial feed, and rotation of the dies) are performed continuously and independently from each other so that they don't interfere with each other.

Turning to the second embodiment of the invention, to avoid repetition certain of the parts are given the same reference characters with the suffix "b."

In the second embodiment, only one pair of dies 21—21 is provided. The dies 21—21 are connected to reciprocal shafts 24 which at one end thereof slide in sockets 60 mounted on one wall of the die housing 5b, and at the other end are mounted on eccentrics 26 on the crankshaft 25. The moving shafts 24 are positioned parallel to the axis 51b by a system of guiding levers 22 and knuckle joint levers 23, and by virtue of this structure the backward and forward movement of the shafts 24 give the dies 21—21 a compound motion, moving in the direction of the work piece, and at the same time the axial movement in the direction of the work piece feed. This gives the work piece an axial feed with each strike.

The guiding levers 22 are mounted upon the die housing 5b so that their position and length can be changed, which enables change in the length of the axial feed, produced by each forming strike.

The backward and forward movement of the two shafts 24 is produced by a crankshaft 25, journalled on the die housing 5b in bearings 72, and it carries the said eccentrics 26, which move the connecting rods 27.

Crankshaft 25 is driven by bevel gear 28, which meshes with bevel gear 30 on flywheel 29, which is free to rotate about hollow shaft 4b. Flywheel 29 is driven by motor 17b.

It is possible in this machine to give the dies every speed wanted between a minimum and a maximum value. The number of strokes and the speed of the axial feed can be regulated independently from each other.

It may be noted that in the second embodiment the crankshaft 25 lies in the center line of the hollow shaft 4b and prevents the putting through of the work piece. This is so far no disadvantage as for most of the applications (for instance, the pointing of tubes, the tapering of bicycle tubes or steel furniture) the length to form is not longer than the dies. On the other hand, it is not difficult to design the control of the machine in such a way that the crankshaft lies out of the center line of the work piece, in case it is necessary to put longer work pieces through the whole machine in order to form them along their whole length.

Figure 3:
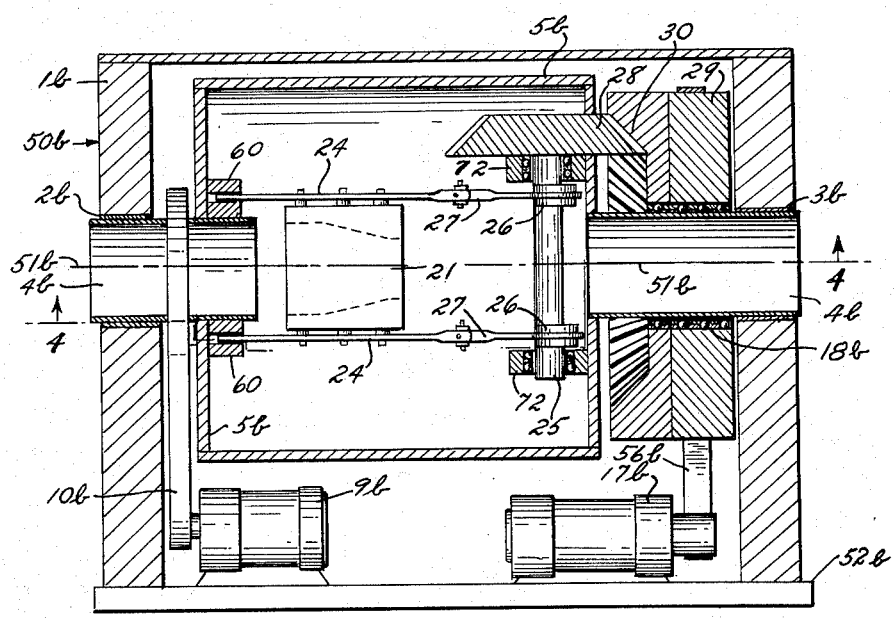
FIGURE 3 is an axial sectional view of a second embodiment of the invention.
Figure 4:
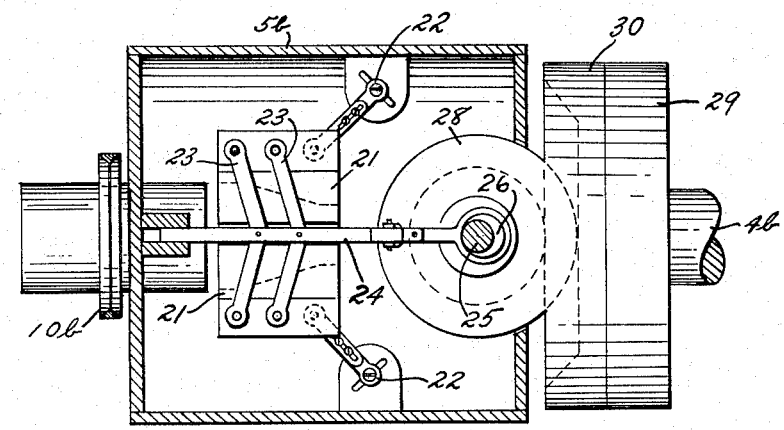
FIGURE 4 is a fragmentary sectional view as seen from the plane 4—4 on FIGURE 3.

In the third embodiment, shown in FIGURES 5 and 6, here again corresponding parts are designated by the same reference numerals with the suffix "c." The bearing of the dies 31 by means of guiding levers 32 and pairs of toggle joint levers 33 corresponds to the execution of the machine shown in FIGURES 3 and 4. In FIGURES 5 and 6, however, the crank shaft which creates the forward and backward movement of the shafts 34 lies outside of the turnable die housing 5c. The shafts 34 are led through the front side of the die housing 5c, and end in a flange 36 which is connected by a double row-axial bearing 37 with the crankshaft 35 which controls the piston rod 38. Also in this execution, the axial feed of the work piece created by every forming strike can be varied by the change of position or length of the guiding levers 32. Independent from this and from the number of revolutions of the crankshaft 35, which determines the number of strokes of the dies, the rotation of the dies in relation to the work piece can be varied by the number of revolutions of the die housing, between a minimum and a maximum value. Also, in the third embodiment no provision is made to lead the work piece completely through the machine because in most of the applications this is not necessary for the above-mentioned reasons.

In all three embodiments, it is understood that the die housing, as well as the dies, are controlled independently by electric motors which are of variable controllable speed, or which control mechanical variable speed devices or transmissions. However, it is obvious that both control units can be unified in one, in order to make it possible to vary the number of the revolutions of the die housing independently of the control for the dies.

We wish it to be understood that we do not desire to be limited to the exact details of construction shown and described, for obvious modifications will occur to a person skilled in the art to which the present invention relates.

We claim:

1. A high speed round kneading machine for use with a workpiece, comprising: a die housing rotatable about the axis of the workpiece; a pair of counter movable dies on said die housing and in substantially the same plane as the workpiece; said dies being constructed and arranged to simultaneously form and axially feed the workpiece; and means to turn said die housing; crank shafts mounted upon said die housing and disposed in a plane which is perpendicular to the workpiece axis, said dies being mounted upon said crankshafts; and means to rotate said crankshafts in opposite directions.

2. A high speed round kneading machine for use with a workpiece, comprising: a die housing rotatable about the axis of the workpiece; a pair of counter movable dies on said die housing and in substantially the same plane as the workpiece; said dies being constructed and arranged to simultaneously form and axially feed said workpiece; and means to turn said die housing; crankshafts mounted on said die housing and disposed about the workpiece, said crankshafts being connected through bevel gears to main shafts which lie substantially parallel to the workpiece and project from the die housing; said main shaft carrying gears which are rotatable concentric to the workpiece; whereby the crank shafts are caused to rotate counter to each other.

3. A high speed round kneading machine for use with a workpiece, comprising: a die housing rotatable about the axis of the workpiece; a pair of counter movable dies on said die housing and in substantially the same plane as the workpiece; said dies being constructed and arranged to simultaneously form and axially feed said workpiece; and means to turn said die housing; said pair of dies in said die housing being connected by knuckle joint levers to said housing; whereby said dies swing generally parallel to the workpiece and have forming strike and axial feed components.

References Cited by the Examiner

UNITED STATES PATENTS

| 2,734,404 | 2/56 | Batty | 78—21 |
| 2,903,923 | 9/59 | Kralowetz | 78—20 |
| 3,066,555 | 12/62 | Brunel | 78—24 |

FOREIGN PATENTS

| 636,761 | 2/62 | Canada. |
| 844,219 | 8/60 | Great Britain. |

WILLIAM J. STEPHENSON, *Primary Examiner.*